No. 862,682. PATENTED AUG. 6, 1907.
J. J. VANDEN BERGH.
SPRING SUPPORT FOR MOTOR CARS.
APPLICATION FILED FEB. 1, 1907.
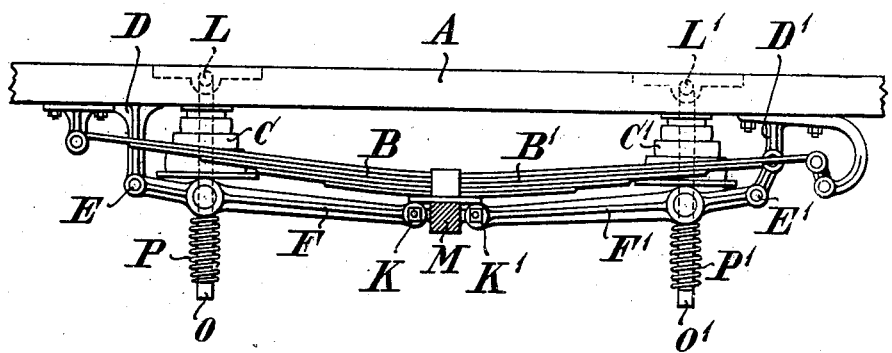
Witnesses:
Inventor:
Johannes Jocobus van den Bergh
By
his Attys.

UNITED STATES PATENT OFFICE.

JOHANNES JACOBUS VANDEN BERGH, OF THE HAGUE, NETHERLANDS.

SPRING-SUPPORT FOR MOTOR-CARS.

No. 862,682.　　　　Specification of Letters Patent.　　　　Patented Aug. 6, 1907.

Application filed February 1, 1907. Serial No. 355,270.

*To all whom it may concern:*

Be it known that I, JOHANNES JACOBUS VANDEN BERGH, of the Hague, Netherlands, a subject of the Queen of the Netherlands, and whose post-office address is No. 16 Dankertsstraat, in the Hague, Netherlands, have invented a new and useful Improvement in Spring-Supports for Motor-Cars, of which the following is a specification.

The invention relates to a new arrangement of spring-supports for motor-cars.

The drawing shows a longitudinal view of the spring-supports mounted on the frame of a motor-car.

Between the axle M and the carriage frame A is arranged a spring B $B^1$, which is just strong enough to bear the weight of the empty vehicle. Between the carriage frame A and the axle M there are also arranged bearings D and $D^1$ and rubber springs C and $C^1$. To the bearings D and $D^1$ are hinged at E and $E^1$ levers F and $F^1$. The said levers are also connected at L and $L^1$ by means of iron rods O and $O^1$, which keep the rubber springs C and $C^1$ at their place between the frame A and the levers F and $F^1$.

The levers F and $F^1$ are connected to the axle M by suitable members K and $K^1$. By means of these levers F and $F^1$ the weight of the passengers or the load is transmitted to the rubber springs C and $C^1$.

The rubber springs C and $C^1$ are made of different plates of rubber of different size and strength, the top-plate is the lightest, the next one heavier and so on till the bottom-plate is the heaviest. The number and strength of plates are according to the number of passengers or the weight of the load for which the motor-car is built. In this way a very elastic support is obtained no matter if the vehicle is empty, loaded with a small or a heavy weight, with a few or many passengers. In the first case the springs B $B^1$ can be made light enough for this purpose and in the second case as soon as the vehicle becomes loaded, by the great strength of the levers working on the rubber springs C and $C^1$, the elasticity of the same is developed in a very high degree, and every molecule of rubber comes in action first in the smallest rubber plates of the springs C and $C^1$ and according as the load becomes heavier the pressure of the levers F and $F^1$ on the rubber springs C and $C^1$ will come successively on the stronger rubber plates of the springs C and $C^1$ including the smaller ones in the mean time. Also the stress of a small load or a small number of passengers will be applied on the smallest rubber plate on the top of the springs C and $C^1$ and the stress of a greater number of passengers or a heavier load will come on the next rubber plate and so on till the full load will come on all the rubber plates from the top to the bottom of the springs C and $C^1$.

The springs P and $P^1$ are connected to the levers F and $F^1$ and the iron rods O and $O^1$ in such a manner as to keep down the frame upon the levers F and $F^1$ so that they can act as spring-checks to prevent the springs C and $C'$ from jumping up abruptly when going over rough or bad roads.

I am aware, that arrangements of spring-supports, showing a combination of metal springs with rubber cushions or rubber springs and with connecting levers are known and I do not claim such combination generally but

What I claim is:—

1. In an arrangement of spring-supports for motor-cars, the combination of springs, an axle supported by means of such springs, levers hinged on bearings of the carriage frame and on the axle, rods hinged on the carriage frame and rubber springs arranged on the said rods between the frame and the hinged levers and consisting of rubber disks of different size and strength, substantially as described and shown in the drawing.

2. In an arrangement of spring-supports for motor-cars the combination of springs, an axle supported by means of such springs, levers hinged on bearings of the carriage frame and on the axle, rods hinged on the carriage frame, rubber springs arranged on the said rods between the frame and the hinged levers and consisting of rubber disks of different size and strength, and additional springs arranged on the said rods opposite to the rubber springs, substantially as described and shown in the drawing.

In testimony whereof I have hereunto set my hand in presence of two subscribing witnesses.

JOHANNES JACOBUS VANDEN BERGH.

Witnesses:
　H. D. JAMESON,
　F. L. RAND.